United States Patent [19]

Nukada et al.

[11] Patent Number: 5,393,881
[45] Date of Patent: Feb. 28, 1995

[54] CRYSTALLINE FORMS OF HYDROXYGALLIUM PHTHALOCYANINE

[75] Inventors: Katsumi Nukada; Katsumi Daimon, both of Minami Ashigara

[73] Assignee: Fuji Xerox Co., Ltd., Tokyo, Japan

[21] Appl. No.: 108,426

[22] Filed: Aug. 19, 1993

[30] Foreign Application Priority Data

Aug. 26, 1992 [JP] Japan .................................. 4-248934
Sep. 14, 1992 [JP] Japan .................................. 4-269080

[51] Int. Cl.$^6$ ............................................. C09B 47/10
[52] U.S. Cl. ........................................ 540/141; 540/139
[58] Field of Search .................................. 540/139, 141

[56] References Cited

U.S. PATENT DOCUMENTS

| | | | |
|---|---|---|---|
| 2,770,629 | 1/1952 | Eastes ................... | 260/314.5 |
| 3,160,635 | 12/1964 | Knudsen et al. ........ | 260/314.5 |
| 3,357,989 | 12/1967 | Byrne et al. ............ | 260/314.5 |
| 3,708,292 | 1/1973 | Brach et al. ............ | 96/1.5 |
| 5,223,027 | 6/1993 | Nonaka et al. ......... | 540/139 |
| 5,282,896 | 2/1994 | Tsuchida et al. ....... | 540/139 |

FOREIGN PATENT DOCUMENTS

| | | |
|---|---|---|
| 50-38543 | 4/1975 | Japan . |
| 59-133551 | 7/1984 | Japan . |
| 1-221459 | 9/1989 | Japan . |
| 3-30854 | 2/1991 | Japan . |

OTHER PUBLICATIONS

Linsky et al. Inorg. Chem., vol. 19, p. 3131 (1980).
Inorg. Chem., vol. 19, p. 311 (1980).
Bull. Soc. Chim., France, vol. 23 (1962).

*Primary Examiner*—Mukund J. Shah
*Assistant Examiner*—Pavanaram K. Sripada
*Attorney, Agent, or Firm*—Oliff & Berridge

[57] ABSTRACT

A halogenated hydroxygallium phthalocyanine crystal shows intense diffraction peaks at Bragg angles (2Θ±0.2°) of (1) 7.7°, 16.5°, 25.1° and 26.6°; (2) 7.9°, 16.5°, 24.4°, and 27.6°; (3) 7.0°, 7.5°, 10.5°, 11.7°, 12.7°, 17.3°, 18.1°, 24.5°, 26.2°, and 27.1°; (4) 7.5°, 9.9°, 12.5°, 16,3°, 18.6°, 25.1°, and 28.3° or (5) 6.8°, 12.8°, 15.8°, and 26.0° and is suited for use in an electrophotographic photoreceptor is disclosed.

1 Claim, 6 Drawing Sheets

CRYSTALLINE FORMS OF HYDROXYGALLIUM PHTHALOCYANINE

FIELD OF THE INVENTION

This invention relates to novel halogen-containing hydroxygallium phthalocyanine crystals useful as a photoconductive material and a novel process for producing the same and an electrophotographic photoreceptor containing the same.

BACKGROUND OF THE INVENTION

Phthalocyanine compounds are useful as coatings, printing inks, catalysts or electronic materials. In recent years, they have been extensively studied particularly for their use as electrophotographic photoreceptor materials, optical recording materials and photoelectric conversion materials.

It is known that phthalocyanine compounds generally exhibit several different crystal forms depending on the process of production or the process of treatment and that the difference in crystal form has a great influence on their photoelectric conversion characteristics. For example, known crystal forms of copper phthalocyanine compounds include $\alpha$-, $\pi$-, $\chi$-, $\rho$-, $\gamma$-, and $\delta$-forms as well as a stable p-form. These crystal forms are known capable of interconversion by mechanical strain application, a sulfuric acid treatment, an organic solvent treatment, a heat treatment, and the like (see, for example, U.S. Pat. Nos. 2,770,629, 3,160,635, 3,708,292, and 3,357,989). Further, JP-A-50-38543 (the term "JP-A" as used herein means an "unexamined published Japanese patent application") has a mention of the relationship between a crystal form of copper phthalocyanine and its electrophotographic characteristics. Besides copper phthalocyanine, application of metal-free phthalocyanine, hydroxygallium phthalocyanine, chloroaluminum phthalocyanine, and chloroindium phthalocyanine in various crystal forms to electrophotographic photoreceptors have been suggested.

With reference to hydroxygallium phthalocyanine crystals, JP-A-1-221459 refers to the crystal obtained by acid pasting in connection to electrophotographic characteristics.

Reported processes for preparing hydroxygallium phthalocyanine include acid pasting of chlorogallium phthalocyanine with sulfuric acid (*Bull. Soc. Chim.*, France, Vol. 23 (1962)) and hydrolysis using ammonium hydroxide and pyridine (*Inorg. Chem.*, Vol. 19, p. 3131 (1980)).

Hydroxygallium phthalocyanine can be obtained by first synthesizing a halogenated gallium phthalocyanine and then hydrolyzing the resulting halogenated gallium phthalocyanine by acid pasting. Known process for producing chlorogallium phthalocyanine, for example, include (i) reaction between gallium trichloride and diiminoisoindoline (*D.C.R. Acad. Sci.*, Vol. 242, p. 1026 (1956)), (ii) reaction between gallium trichloride and phthalonitrile (JP-B-3-30854; the term "JP-B" as used herein means an "examined published Japanese patent application"), (iii) reaction between gallium trichloride and phthalonitrile in butyl cellosolve in the presence of a catalyst (JP-A-1-221459), (iv) reaction between gallium trichloride and phthalonitrile in quinoline (*Inorg. Chem.*, Vol. 19, p. 3131 (1980), (v) reaction between gallium tribromide and phthalonitrile (JP-A-59-133551), and (vi) reaction between gallium triiodide and phthalonitrile (JP-A-60-59354).

However, electrophotographic characteristics of the hydroxygallium phthalocyanine obtained by acid-pasting hydrolysis of the halogenated gallium phthalocyanine synthesized by any of the known processes are greatly dependent on the process used for synthesizing the starting halogenated gallium phthalocyanine. That is, even with the crystal form being equal, the resulting hydroxygallium phthalocyanine compounds show large variation in performance as an electrophotographic photoreceptor, particularly charging properties and dark decay rate, and it has been difficult to obtain a photoreceptor with stable characteristics.

While various proposals on phthalocyanine compounds have been made to date as described above, it is still demanded to develop phthalocyanine compounds with further improved performance properties.

SUMMARY OF THE INVENTION

An object of the present invention is to provide a halogen-containing hydroxygallium phthalocyanine having a novel crystal form useful as a photoconductive material for providing an electrophotographic photoreceptor with stabilized characteristics.

Another object of the present invention is to provide an electrophotographic photoreceptor with stabilized characteristics containing such a halogen-containing hydroxygallium phthalocyanine crystal.

Still another object of the present invention is to produce hydroxygallium phthalocyanine with stabilized electrophotographic characteristics by a process of synthesis different from the conventional ones.

The present inventors have conducted extensive investigations on the relationship between a crystal form of various phthalocyanine compounds and electrophotographic characteristics and, as a result, they discovered five novel crystal forms of halogen-containing hydroxygallium phthalocyanine compounds. They confirmed that each of these crystals is a superior photoconductive material providing an excellent electrophotographic photoreceptor, and thus reached the present invention.

As a result of investigations, the present inventors have found that hydrolysis of halogenated gallium phthalocyanine synthesized by using a specific solvent gives hydroxyphthalocyanine with stabilized electrophotographic characteristics, particularly sensitivity, and thus completed the present invention.

The present invention relates to a halogen-containing hydroxygallium phthalocyanine crystal showing intense diffraction peaks at Bragg angles ($2\Theta \pm 0.2°$) of (1) 7.7°, 16.5°, 25.1° and 26.6°; (2) 7.9°, 16.5°, 24.4°, and 27.6°; (3) 7.0°, 7.5°, 10.5°, 11.7°, 12.7°, 17.3°, 18.1°, 24.5°, 26.2° and 27.1°; 4) 7.5°, 9.9°, 12.5°, 16.3°, 18.6°, 25.1°, and 28.3°; or (5) 6.8°, 12.8°, 15.8°, and 26.0°.

The present invention further relates to an electrophotographic photoreceptor comprising a photosensitive layer containing the above-mentioned halogen-containing hydroxygallium phthalocyanine crystal as a charge generating material.

The present invention still further relates to a process for producing hydroxygallium phthalocyanine comprising reacting a gallium trihalide with phthalonitrile or diiminoisoindoline in an aromatic hydrocarbon solvent and hydrolyzing the resulting halogenated gallium phthalocyanine.

The present invention yet further relates to a hydroxygallium phthlocyanine having the above crystal form by the above process for producing thereof.

DETAILED DESCRIPTION OF THE INVENTION

Figure 1:
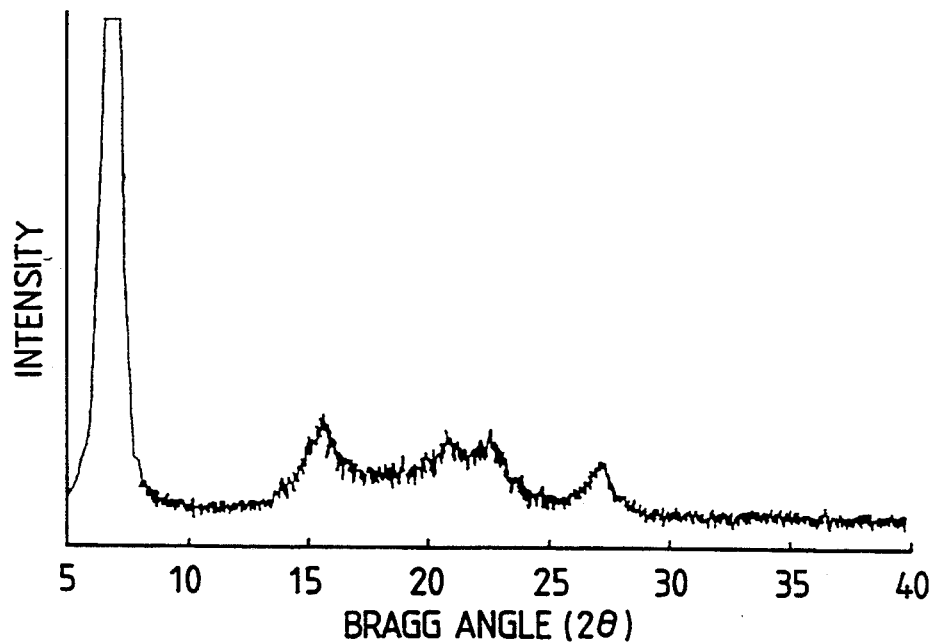
FIG. 1 is a powder X-ray diffraction pattern of the crude chlorine-containing hydroxygallium phthalocyanine crystals obtained in Synthesis Example 5.

Halogen-containing hydroxygallium phthalocyanine according to the present invention can be synthesized by reacting gallium trihalide and phthalonitrile or diiminoisoindoline in an aromatic hydrocarbon solvent and hydrolyzing the resulting haloganated gallium phthalocyanine.

In the present invention, halogenated gallium phthalocyanine is synthesized from gallium trihalide and phthalonitrile or diiminoisoindoline. Phthalonitrile or diiminoisoindoline is preferably used in an amount of at least 4 times, usually from 4 to 10 times, equivalent to gallium trihalide. The aromatic hydrocarbon solvent to be used in the reaction preferably has a boiling point of 150° C. or higher from the standpoint of the production rate of halogenated gallium phthalocyanine. In particular, halogenated hydrocarbon solvents, such as α- or β-chloronaphthalene, o- or p-dichlorobenzene, and trichlorobenzene, are preferred. Of them, α- or β-chloronaphthalene is more preferred. The aromatic hydrocarbon can be used in an amount of from 0.2 to 20 times by weight of phthalonitrile or diiminoisoindoline. If the amount of the solvent is too small, the reaction system is difficult to stir. Use of too much a solvent not only necessitates much time for the reaction but is uneconomical. Accordingly, the solvent is desirably used in an amount of from 0.3 to 10 times by weight of phthalonitrile or diiminoisoindoline.

The reaction can be carried out by heating at a temperature of from 100° C. up to the boiling point of the solvent in an inert atmosphere, such as nitrogen for 2 to 40 hours.

As a gallium trihalide, gallium trichloride is preferred.

The halogenated gallium phthalocyanine thus synthesized is then washed with a solvent. Solvents to be used preferably include amide solvents, such as DMF and NMP. The washing with a solvent is carried out by collecting the reaction product by filtration and dispersing the resulting filter cake in an amide solvent with stirring, if desired, under heating. The washing may be effected simply by washing the filter cake with an amide solvent.

The thus obtained halogenated gallium phthalocyanine is then hydrolyzed with an acid or a base. That is, a solution of halogenated gallium phthalocyanine in an acid or a base is poured into an appropriate solvent to precipitate hydroxygallium phthalocyanine.

Acids which can be used for the hydrolysis include those highly capable of dissolving halogenated gallium phthalocyanine, such as trichloroacetic acid, trifluoroacetic acid, phosphoric acid, methanesulfonic acid, hydrochloric acid, sulfuric acid, and nitric acid. Sulfuric acid is particularly preferred for its high dissolving power and ease of handling because of no fuming properties. The acid is used in an amount usually of from 2 to 70 parts, and preferably of from 10 to 50 parts by weight of halogenated gallium phthalocyanine. The temperature for dissolving halogenated gallium phthalocyanine ranges from 0° to 100° C., and preferably 5° to 80° C.

Solvents into which the halogenated gallium phthalocyanine solution is poured include water, a mixed solvent of water and an organic solvent, and an alkali aqueous solution. The solvent is used in an amount of from 2 to 70 parts, and preferably from 5 to 50 parts by weight of the acid used. In order to avoid heat generation, the solvent is preferably kept below 10° C.

Bases which can be used for the hydrolysis preferably include strong bases, such as ammonium hydroxide, sodium hydroxide, and potassium hydroxide. These bases are used as an aqueous solution or a solution in an organic solvent, e.g., alcohols, pyridine, and quinoline. The base is used in an amount of at least 1 equivalent to a halogenated gallium phthalocyanine. Heating is effective for accelerating the hydrolysis.

The hydroxygallium phthalocyanine resulting from the hydrolysis contains a halogen atom. The halogen-containing hydroxygallium phthalocyanine seems to have a structural formula shown below.

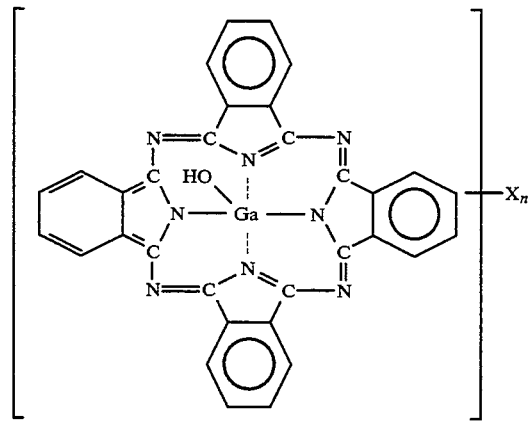

wherein X represents Cl, Br or I; and n is a number greater than 0.

The resulting halogen-containing hydroxygallium phthalocyanine is then subjected to a solvent treatment to obtain a desired crystal form. Before being put to a solvent treatment, the synthesized halogen-containing hydroxygallium phthalocyanine may be ground in a ball mill, a mortar, a sand mill, a kneader, etc. with a solvent (wet grinding) or without a solvent (dry grinding).

The solvent which can be used for the solvent treatment are selected from amides (e.g., dimethylformamide and N-methylpyrrolidone), esters (e.g., ethyl acetate and butyl acetate), and ketones (e.g., acetone and methyl ethyl ketone), mixtures thereof, and mixtures of these solvents and water according to a desired crystal form.

Figure 6:
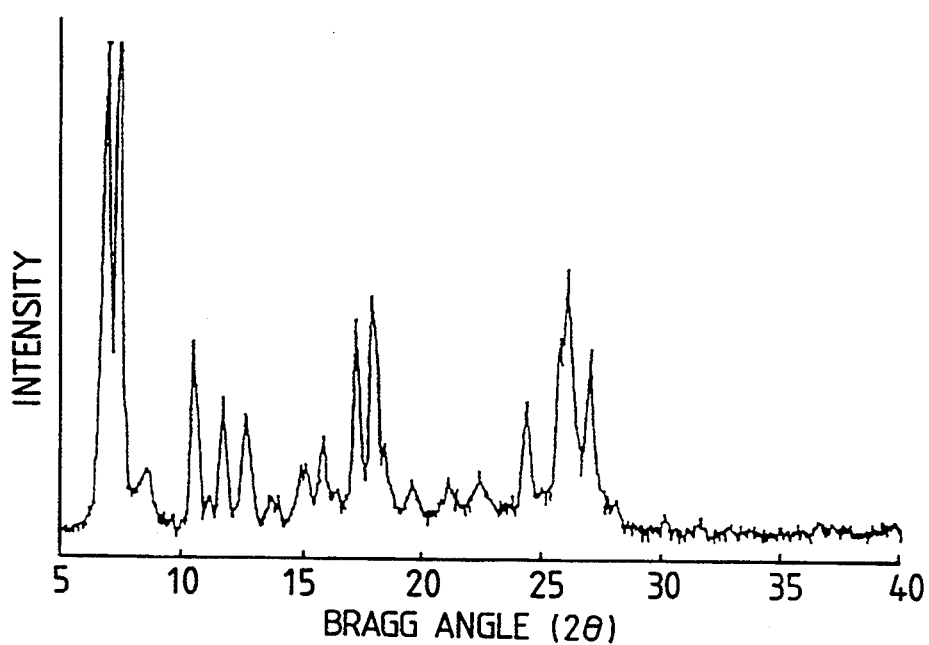
Figure 7:
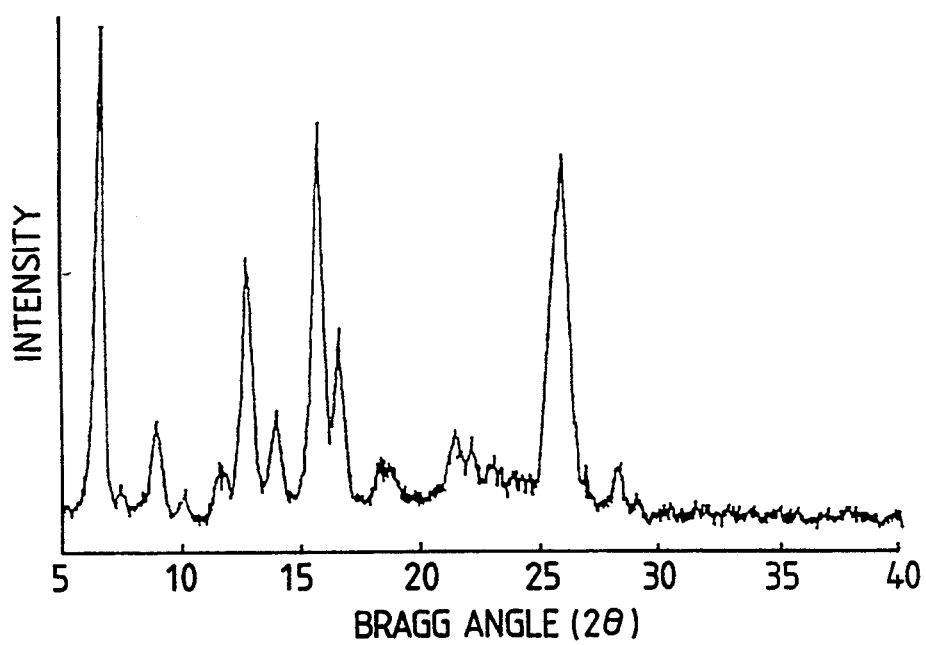

More specifically, alcohols (e.g., methanol and ethanol), polyhydric alcohols (e.g., ethylene glycol, glycerin, and polyethylene glycol), aromatic hydrocarbons (e.g., toluene, xylene and chlorobenzene), sulfoxides (e.g., dimethyl sulfoxide), etc. are used for obtaining (1) a halogen-containing hydroxygallium phthalocyanine crystal having intense diffraction peaks at Bragg angles ($2\Theta \pm 0.2°$) of 7.7°, 16.5°, 25.1°, and 26.6° (see FIG. 4); amides (e.g., N,N-dimethylformamide, N,N-dimethylacetamide and N-methylpyrrolidone), organic amines (e.g., pyridine and piperidine), sulfoxides (e.g., dimethyl sulfoxide), etc. are used for obtaining (2) a halogen-containing hydroxygallium phthalocyanine crystal having intense diffraction peaks at Bragg angles ($2\Theta \pm 0.2°$) of 7.9°, 16.5°, 24.4° and 27.6° (see FIG. 5); aromatic alcohols (e.g., benzyl alcohol), etc. are used for obtaining (3) a halogen-containing hydroxygallium phthalocyanine crystal having intense diffraction peaks at Bragg angles ($2\Theta \pm 0.2°$) of 7.0°, 7.5°, 10.5°, 11.7°, 12.7°, 17.3°, 18.1°, 24.5°, 26.2°, and 27.1° (see FIG. 6); amides (e.g., N,N-dimethylformamide, N,N-dimethylacetamide and N-methylpyrrolidone), acetic esters (e.g., ethyl acetate, n-butyl acetate and isoamyl acetate), ketones (e.g., acetone, methyl ethyl ketone and methyl isobutyl), etc. are used for obtaining (4) a halogen-containing hydroxygallium phthalocyanine crystal having intense diffraction peaks at Bragg angles ($2\Theta \pm 0.2°$) of 7.5°, 9.9°, 12.5°, 16.3°, 18.6°, 25.1°, and 28.3° (see FIGS. 3 and 8); and polyhydric alcohols (e.g., ethylene glycol, glycerin, and polyethylene glycol), etc. are used for obtaining (5) a halogen-containing hydroxygallium phthalocyanine crystal having intense diffraction peaks at Bragg angles ($2\Theta \pm 0.2°$) of 6.8°, 12.8°, 15.8°, and 26.0° (see FIG. 7).

In the present invention, the X-ray diffraction pattern in the measurement results of intensities of the Bragg angle ($2\Theta$) respect to CuK$\alpha$ characteristic X-ray (wavelength: 1,541 Å). The measurement conditions are as follows:

Apparatus: X-ray diffractometer (RAD-RC produced by Rigaku K.K.)
Target: Cu (1.54050 Å)
Voltage: 40.0 KV
Stage angle: 5.00 deg
Stop angle: 40.00 deg
Step angle: 0.020 deg The amount of the solvent to be used in the solvent treatment ranges from 1 to 200 parts by weight, and preferably from 10 to 100 parts by weight, per part by weight of hydroxygallium phthalocyanine.

The solvent treatment can be carried out at a temperature of from 0° to 150° C., and preferably from room temperature to 100° C. If desired, the treatment may be effected while wet grinding with grinding aids, such as sodium chloride and sodium sulfate (salt cake). The grinding aid is used in an amount of from 0.5 to 20 parts by weight, and preferably from 1 to 10 parts by weight, per part by weight of the hydroxygallium phthalocyanine.

The electrophotographic photoreceptor according to the present invention in which the above-described halogen-containing hydroxygallium phthalocyanine crystals are used as a charge generating material in the photosensitive layer thereof will be explained below.

Figure 10:
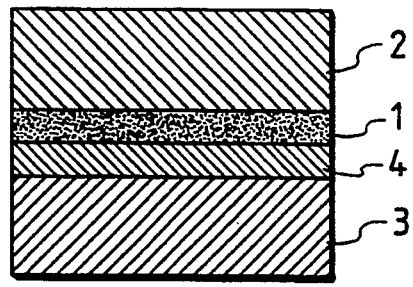
Figure 11:
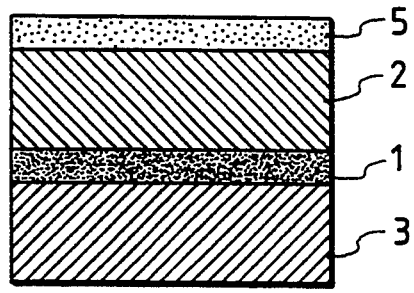
Figure 12:
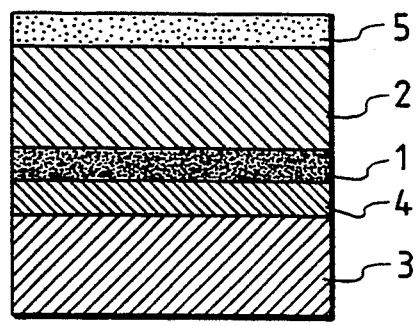

The photosensitive layer may have either a single layer structure or a laminate structure composed of a charge generating layer and a charge transporting layer. FIGS. 9 through 12 each show a schematic cross section of the laminate type photoreceptor according to the present invention. The photoreceptor of FIG. 9 comprises conductive substrate 3 having provided thereon charge generating layer 1 and charge transporting layer 2 in this order. Subbing layer 4 may be provided between charge generating layer 1 and conductive substrate 3 as shown in FIG. 10. Protective layer 5 may be provided on the surface of the photosensitive layer as shown in FIG. 11. The photoreceptor of FIG. 12 has both subbing layer 4 and protective layer 5.

The photoreceptor of the present invention will further be explained below with particular reference to a laminate structure.

Conductive substrate 3 includes metals, e.g., aluminum, nickel, chromium, and stainless steel; plastic films having thereon a thin film of aluminum, titanium, nickel, chromium, stainless steel, gold, vanadium, tin oxide, indium oxide, indium-tin oxide (ITO), etc.; and paper or plastic films coated or impregnated with a conductivity-imparting agent. While not limiting, conductive substrate 3 usually has a drum shape, a sheet shape, or a plate shape.

If desired, conductive substrate 3 may be subjected to various surface treatments as far as the image quality is not impaired. For example, it is subjected to an oxidation treatment, a chemical treatment, a coloring treatment, or a non-specular finish, such as surface graining.

If desired, subbing layer 4 may be provided between conductive substrate 3 and charge generating layer 1. Subbing layer 4 functions to block injection of unnecessary charges from conductive substrate 3 into a photosensitive layer on charging of the photosensitive layer. It also serves as an adhesive layer for adhesion between conductive substrate 3 and the photosensitive layer. In some cases, subbing layer 4 is effective to prevent light reflection on conductive substrate 3.

Materials for constituting subbing layer 4 include polyethylene resins, polypropylene resins, acrylic resins, zirconium chelate compounds, titanyl chelate compounds, titanium alkoxides, organotitanium compounds, and silane coupling agents. Subbing layer 4 usually has a thickness of from 0.01 to 10 μm, and preferably from 0.05 to 2 μm.

Charge generating layer 1 is composed of the halogen-containing hydroxygallium phthalocyanine crystals prepared by the above-mentioned process and a binder resin.

Binder resins to be used can be chosen from a broad range of insulating resins, such as polyvinyl butyral, polyarylate resins (e.g., a polycondensate of bisphenol A and phthalic acid), polycarbonate resins, polyester resins, phenoxy resins, vinyl chloride-vinyl acetate copolymers, polyvinyl acetate, acrylic resins, polyacrylamide resins, polyvinyl pyridine, cellulose resins, urethane resins, epoxy resins, casein, polyvinyl alcohol, and polyvinyl pyrrolidone. Organic photoconductive polymers, such as poly-N-vinylcarbazole, polyvinyl anthracene, and polyvinylpyrene, can also be used.

Solvents to be used for dissolving the binder resin include methyl alcohol, ethyl alcohol, n-propyl alcohol, n-butyl alcohol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These organic solvents may be used either individually or in combination of two or more thereof.

A weight ratio of the halogen-containing hydroxygallium phthalocyanine crystals to the binder resin is preferably from 10:1 to 1:10. The crystals are dispersed in the resin solution by a general means, e.g., a ball mill, an attritor or a sand mill. It is essential that the crystal form of the halogen-containing hydroxygallium phthalocyanine is not changed by dispersion. The inventors have confirmed that the crystal form is not changed by any of the above-mentioned dispersion methods. It is effective to finely disperse the crystals to a particle size of not greater than 0.5 μm, preferably not greater than 0.3 μm, and more preferably not greater than 0.15 μm.

Charge generating layer 1 usually has a thickness of from 0.1 to 5 μm, and preferably from 0.2 to 2.0 μm.

Charge transporting layer 2 consists of an appropriate binder resin having dispersed therein a charge transporting material.

Any of known charge transporting materials can be utilized. Examples of suitable charge transporting materials include oxadiazole derivatives, e.g., 2,5-bis(p-diethylaminophenyl)-1,3,4-oxadiazole; pyrazoline derivatives, e.g., 1-[pyridyl-(2)]-3-(p-diethylaminostyryl)-5-(p-diethylaminophenyl)pyrazoline; aromatic tertiary monoamino compounds, e.g., triphenylamine and dibenzylaniline; aromatic tertiary diamino compounds, e.g., N,N'-diphenyl-N,N'-bis(3-methylphenyl)-[1,1'-biphenyl]-4,4'-diamine; hydrazone derivatives, e.g., 4-diethylaminobenzaldehyde 1,1'-diphenylhydrazone; and α-stilbene derivatives, e.g., p-(2,2'-diphenylvinyl)-N,N-diphenylaniline. In addition, semiconductive high polymers, such as poly-N-vinylcarbazole and its derivatives, polyvinylpyrene, polyvinylanthracene, polyvinylacridine, poly-9-vinylphenylanthracene, pyrene-formaldehyde resins, and ethylcarbazole-formaldehyde resins, may also be used. These charge transporting materials may be used either individually or in combination of two or more thereof.

Binder resins which can be used in charge transporting layer 2 can be selected from known binder resins, such as polycarbonate resins, polyester resins, methacrylic resins, acrylic resins, polyvinyl chloride resins, polyvinylidene chloride resins, polystyrene resins, polyvinyl acetate resins, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone-alkyd resins, phenol-formaldehyde resins, styrene-alkyd resins, and poly-N-vinylcarbazole resins. These binder resins may be used either individually or in combination of two or more thereof.

A suitable weight ratio of the charge transporting material to the binder resin is from 10:1 to 1:5.

Charge transporting layer 2 usually has a thickness of from 5 to 50 μm, and preferably of from 10 to 30 μm.

If desired, protective layer 5 comprising an appropriate binder resin may be provided on the surface of charge transporting layer 2. Protective layer 5 may contain conductive fine particles.

The present invention will now be illustrated in greater detail with reference to Synthesis Examples and Examples, but it should be understood that the present invention is not deemed to be limited thereto. All the parts and percents are by weight unless otherwise indicated.

SYNTHESIS EXAMPLE 1

To 1500 ml of α-chloronaphthalene were added 100 parts of gallium trichloride and 291 parts of o-phthalonitrile, and the mixture was allowed to react at 200° C. for 4 hours in a nitrogen stream. The formed chlorogallium phthalocyanine was collected by filtration and dispersed in 1000 ml of dimethylformamide (DMF) and heated at 150° C. for 30 minutes with stirring, followed by filtration. The wet cake was thoroughly washed with methanol and dried to obtain 156 parts (44.1%) of chlorogallium phthalocyanine crystals.

As a result of analysis, the chlorine content of the resulting crystals was found to be 5.84% (the calculated chlorine content for $C_{32}H_{16}N_6CaCl$ was 5.74%).

SYNTHESIS EXAMPLE 2

To 100 ml of α-chloronaphthalene were added 10 parts of gallium trichloride and 29.1 parts of o-phthalonitrile, and the mixture was allowed to react at 200° C. for 4 hours in a nitrogen stream. The formed chlorogallium phthalocyanine was collected by filtration, and the wet cake was dispersed in 100 ml of DMF and heated at 150° C. for 30 minutes with stirring, followed by filtration. The wet cake was thoroughly washed with methanol and dried to obtain 28.9 parts (82.5%) of chlorogallium phthalocyanine crystals. The chlorine content of the resulting crystals was found to be 6.49%.

SYNTHESIS EXAMPLE 3

To 100 ml of o-dichlorobenzene were added 10 parts of gallium trichloride and 29.1 parts of o-phthalonitrile, and the mixture was allowed to react at 180.5° C. for 4 hours in a nitrogen stream. The formed chlorogallium phthalocyanine was collected by filtration, dispersed in 100 ml of DMF, and heated at 150° C. for 30 minutes with stirring, followed by filtration. The wet cake was thoroughly washed with methanol and dried to obtain 12.2 parts (34.6%) of chlorogallium phthalocyanine crystals. The chlorine content of the resulting crystals was found to be 10.09%.

SYNTHESIS EXAMPLE 4

The same procedure as in Synthesis Example 3 was repeated, except for replacing o-dichlorobenzene with p-dichlorobenzene. After washing, 5.1 parts (14.5%) of chlorogallium phthalocyanine crystals having a chlorine content of 9.73% were obtained.

SYNTHESIS EXAMPLE 5

Six parts of the chlorogallium phthalocyanine crystals obtained in Synthesis Example 1 were dissolved in 180 parts of concentrated sulfuric acid at 0° C., and the solution was added dropwise to 900 parts of distilled water at 5° C. to precipitate crystals. The crystals were thoroughly washed with distilled water. A powder X-ray diffraction pattern of the resulting crystals is shown in FIG. 1.

The crystals turned from deep green to deep blue on addition of diluted aqueous ammonia.

Figure 2:
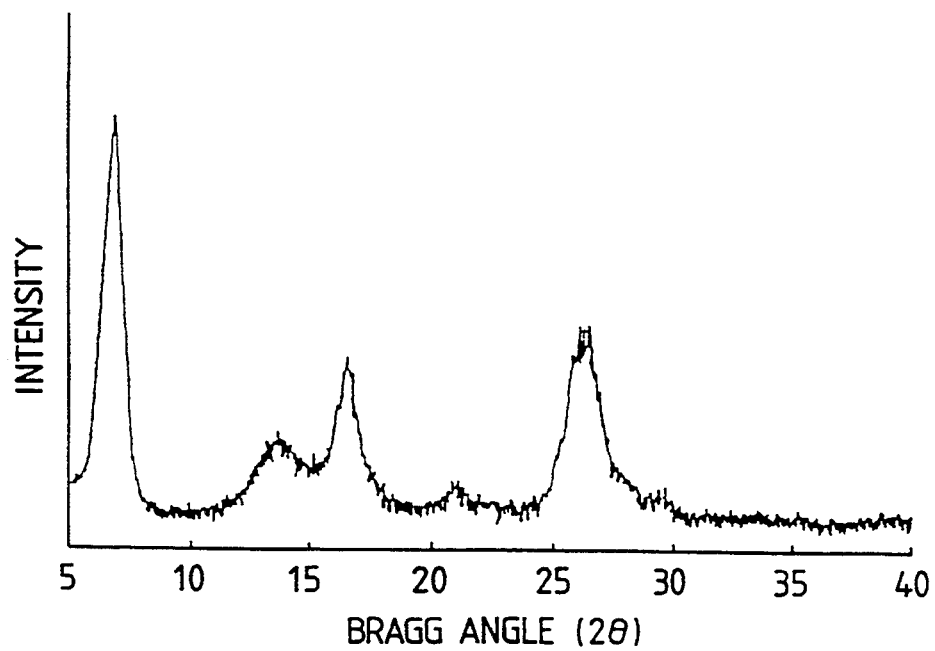
FIG. 2 is a powder X-ray diffraction pattern of the purified chlorine-containing hydroxygallium phthalocyanine crystals obtained in Synthesis Example 5.

The crystals were further thoroughly washed with distilled water and dried to recover 5.1 parts of chlorine-containing hydroxygallium phthalocyanine crystals having a chlorine content of 0.35%. A powder X-ray diffraction pattern of the resulting crystals is shown in FIG. 2.

SYNTHESIS EXAMPLES 6 TO 8

Chlorine-containing hydroxygallium phthalocyanine crystals were obtained in the same manner as in Synthesis Example 5, except for using 6 parts of each of the chlorogallium phthalocyanine crystals obtained in Synthesis Examples 2 to 4. The chlorine content was found to be 0.96% (Synthesis Example 6), 4.78% (Synthesis Example 7) or 4.35% (Synthesis Example 8).

COMPARATIVE SYNTHESIS EXAMPLE 1

To 230 parts of quinoline were added 30 parts of 1,3-diiminoisoindoline and 9.1 parts of gallium trichloride, and the mixture was allowed to react at 200° C. for 3 hours in a nitrogen stream. The formed chlorogallium phthalocyanine were collected by filtration, washed with acetone and methanol, and dried to obtain 28 parts of chlorogallium phthalocyanine.

COMPARATIVE SYNTHESIS EXAMPLE 2

Phthalonitrile (29.1 parts) and 10 parts of gallium trichloride were reacted in a 300 ml flask at 300° C. for 4 hours in a nitrogen stream. The resulting blue mass was finely ground in a mortar and suspended in 200 ml of DMF, followed by heat-refluxing for 1.5 hours in a nitrogen stream. The resulting chlorogallium phthalocyanine crystals were collected by filtration and washed. The crystals were further washed with DMF two more times and finally with 600 ml of methanol three times and dried to obtain 25.1 parts of chlorogallium phthalocyanine crystals.

The results of elementary analysis of the resulting chlorogallium phthalocyanine crystals were as follows. Further, the mass spectrum determination revealed that the chlorogallium phthalocyanine was a mixture of gallium phthalocyanine compounds having 0 to 4 chlorine atoms on the phthalocyanine ring thereof.

Elementary Analysis for $C_{32}H_{16}N_8GaCl$ (%): Calcd.: C: 62.22; H: 2.61; N: 18.14; Cl: 5.74; Found: C: 60.80; H: 2.43; N: 17.15; Cl: 6.95.

EXAMPLES 1 TO 8

In 15 parts of a solvent shown in Table 1 below was put 0.5 part of the chlorine-containing hydroxygallium phthalocyanine crystals obtained in Synthesis Examples 5 to 8. The mixture was milled with 30 parts of glass beads having a diameter of 1 mm for 24 hours. The crystals were separated, washed with methyl alcohol, and dried to obtain chlorine-containing hydroxygallium phthalocyanine crystals.

A powder X-ray diffraction pattern of the resulting hydroxygallium phthalocyanine crystals are shown in Table 1. In Table 1, $HOGaPc-Cl_x$ means chlorine-containing hydroxygallium phthalocyanine crystals.

TABLE 1

Figure 3:
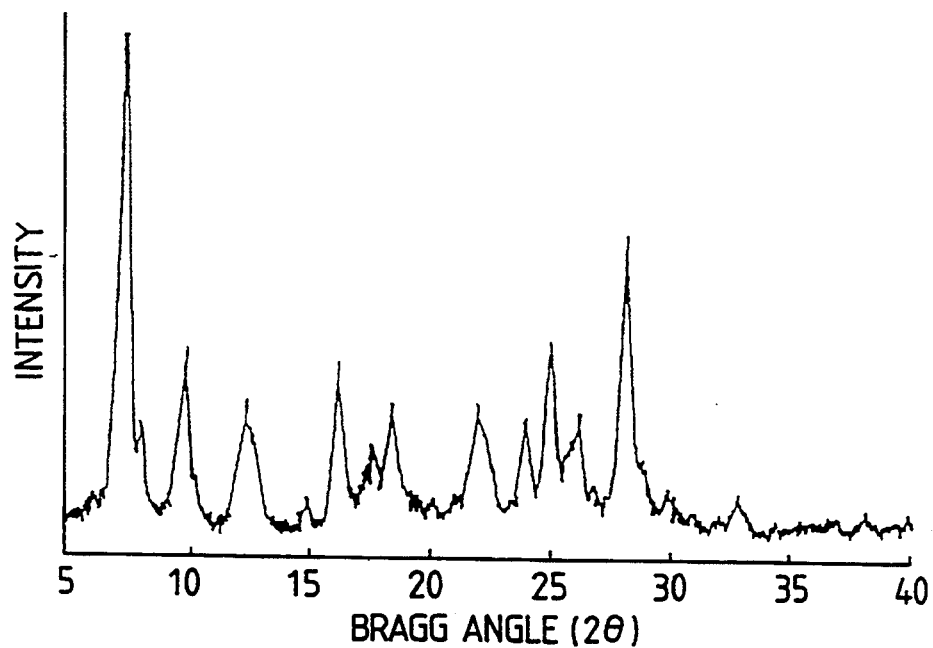
FIGS. 3 through 8 are each a powder X-ray diffraction pattern of the chlorine-containing hydroxygallium phthalocyanine crystals obtained in Examples 1 to 5 and Example 7, respectively.
Figure 4:
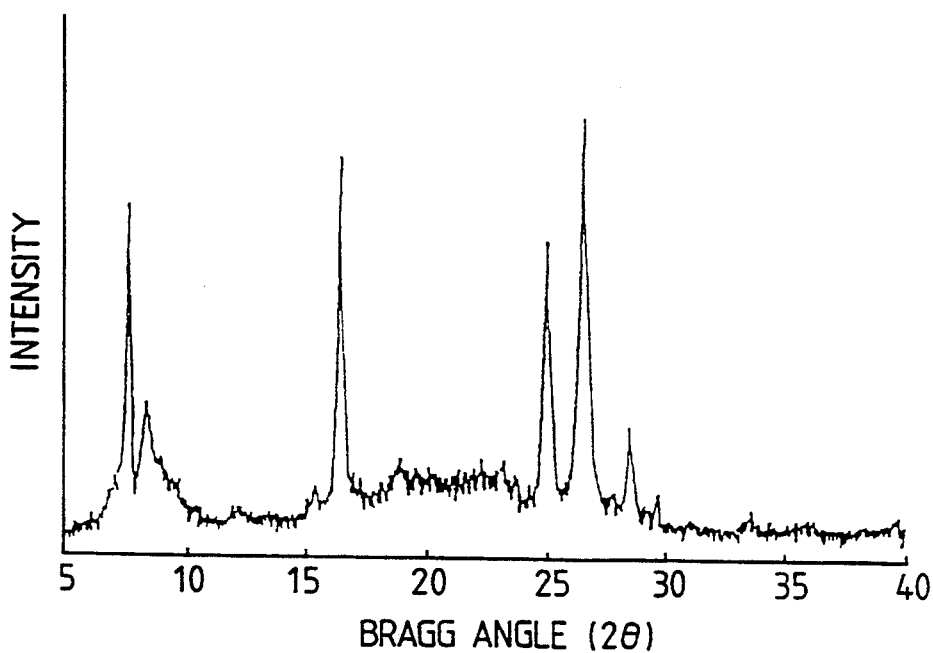
Figure 5:
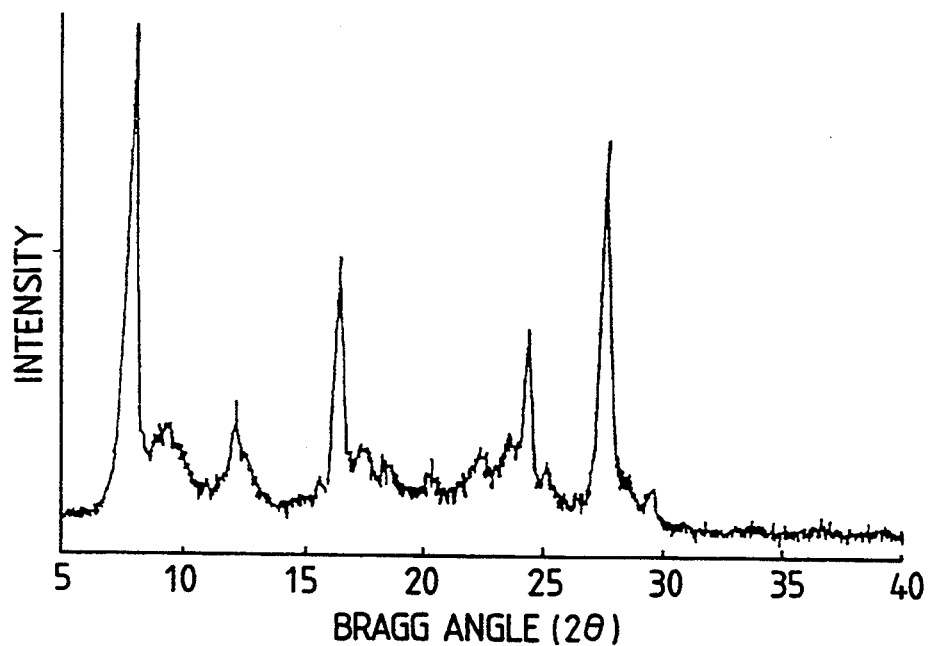
Figure 8:
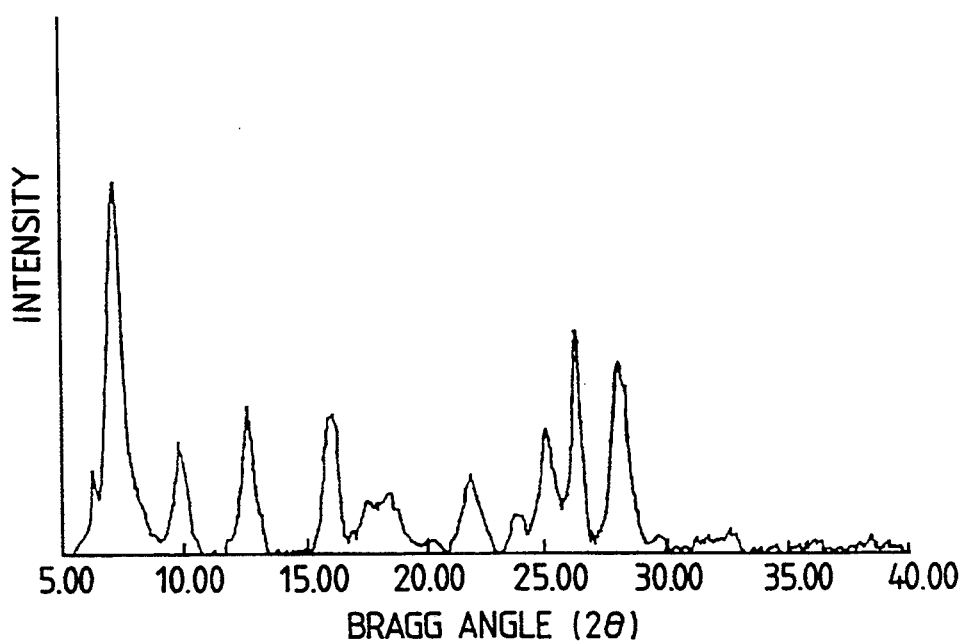
Figure 9:
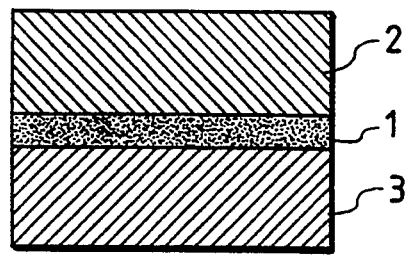
FIGS. 9 to 12 each show a schematic cross section of an electrophotographic photoreceptor according to the present invention.

| Example No. | $HOGaPc-Cl_x$ | Solvent Used | X-Ray Diffraction Pattern |
|---|---|---|---|
| 1 | Synthesis Example 5 | DMF | FIG. 3 |
| 2 | Synthesis Example 5 | methanol | FIG. 4 |
| 3 | Synthesis Example 5 | dimethyl sulfoxide | FIG. 5 |
| 4 | Synthesis Example 5 | benzyl alcohol | FIG. 6 |
| 5 | Synthesis Example 5 | ethylene glycol | FIG. 7 |
| 6 | Synthesis Example 6 | DMF | the same as FIG. 3 |
| 7 | Synthesis Example 7 | butyl acetate | FIG. 8 |
| 8 | Synthesis Example 8 | butyl acetate | the same as FIG. 8 |

EXAMPLE 9

Three parts of the chlorogallium phthalocyanine crystals obtained in Synthesis Example 1 were dissolved in parts of concentrated sulfuric acid at 0° C., and the solution was added dropwise to 450 parts of distilled water at 5° C. to reprecipitate crystals. The crystals were thoroughly washed with distilled water. A powder X-ray diffraction pattern of the resulting crystals is the same as FIG. 1. The crystals were further washed with diluted aqueous ammonia, suspended in 100 ml of 2% aqueous ammonia, and stirred at room temperature for 1 hour. On addition of the 2% aqueous ammonia, the hue of the crystals changed from deep green to deep blue. The crystals were thoroughly washed with distilled water and dried to obtain 0.5 part of hydroxygallium phthalocyanine crystals. A powder X-ray diffraction pattern of the resulting crystals is the same as FIG. 2. To 15 parts of N,N-dimethylformamide was added 0.5 part of the resulting hydroxygallium phthalocyanine crystals and milled together with 30 parts of glass beads having a diameter of 1 mm for 24 hours. The crystals were separated, washed with methanol, and dried to obtain hydroxygallium phthalocyanine crystals. A powder X-ray diffraction pattern of the resulting crystals is the same as FIG. 3.

EXAMPLES 10 TO 12 AND COMPARATIVE EXAMPLES 1 TO 2

Figure 13:
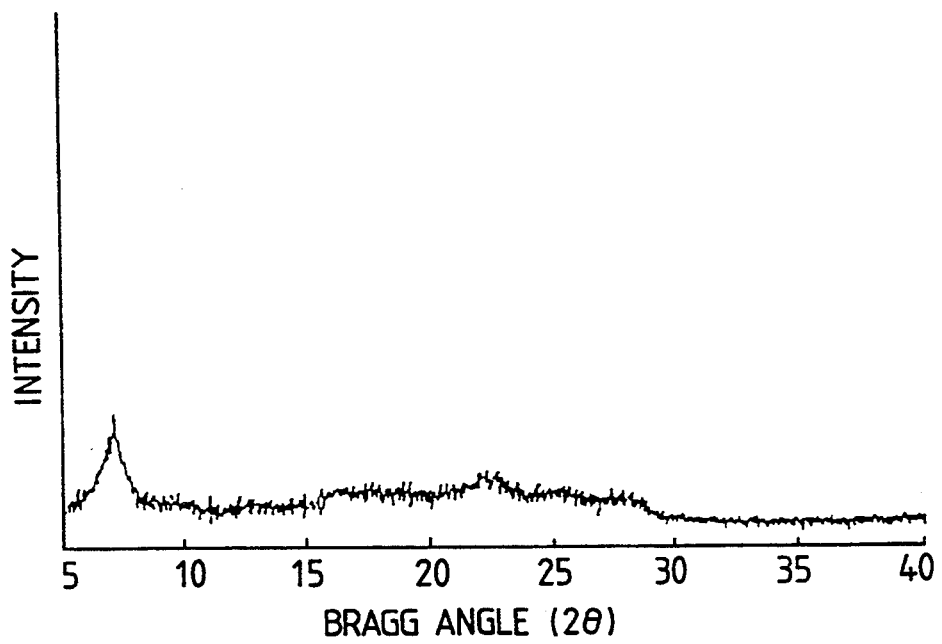
FIG. 13 is a powder X-ray diffraction pattern of the hydroxygallium phthalocyanine crystals obtained in Comparative Example 2.

Hydroxygallium phthalocyanine crystals were obtained in the same manner as in Example 9, except for replacing the chlorogallium phthalocyanine crystals obtained in Synthesis Example 1 with each of the chlorogallium phthalocyanine crystals obtained in Synthesis Examples 2 to 4 and Comparative Synthesis Examples 1 to 2. The hydroxygallium phthalocyanine crystals using the chlorogallium phthalocyanine crystals in Synthesis Examples 2 to 4 and Comparative Synthesis Examples 1 to 2 correspond to Examples 10 to 12 and Comparative Examples 1 to 2, respectively. The powder X-ray diffraction pattern of each of the crystals of Examples 10 to 12 and Comparative Example 1 was the same as FIG. 3. The powder X-ray diffraction pattern of Comparative Example 2 is shown in FIG. 13.

EXAMPLE 13

A solution consisting of 10 parts of a zirconium compound (Orgatics ZC540 produced by Matsumoto Seiyaku K.K.), 1 part of a silane compound (A 1110 produced by Nippon Unicar Co., Ltd.), 40 parts of isopropyl alcohol, and 20 parts of butyl alcohol was coated on an aluminum substrate by dip coating and dried by heating at 150° C. for 10 minutes to form a subbing layer having a thickness of 0.5 μm.

The chlorine-containing hydroxygallium phthalocyanine crystals obtained in Example 1 (0.1 part) were mixed with 0.1 part of a polyvinyl butyral resin (S-Lec BM-S produced by Sekisui Chemical Co., Ltd.) and 10 parts of n-butyl acetate, and the mixture was dispersed in a paint shaker together with glass beads for 1 hour. The resulting coating composition was coated on the subbing layer with a wire bar No. 5 and dried by heating at 100° C. for 10 minutes to form a charge generating layer having a thickness of 0.15 μm. X-Ray diffractometry of the hydroxygallium phthalocyanine crystals in the coating composition revealed that the crystal form had not changed on being dispersed.

In 20 parts of monochlorobenzene were dissolved 2 parts of a compound represented by formula (1):

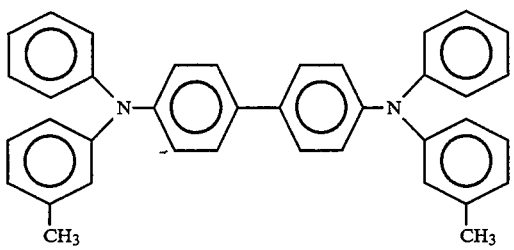

and 3 parts of a polycarbonate resin represented by formula (2):

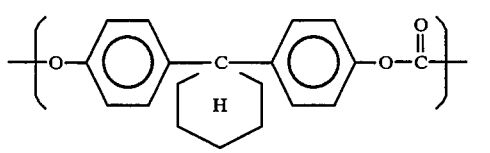

and the resulting coating composition was coated on the charge generating layer by dip coating and dried by heating at 120° C. for 1 hour to form a charge transporting layer having a thickness of 20 μm.

Electrophotographic characteristics of the thus prepared electrophotographic photoreceptor were evaluated by using a flat plate scanner as follows. The photoreceptor was charged to a potential of $V_0$ (V) by a corona discharge of $-2.5$ μA under a normal temperature and normal humidity condition (20° C., 40% RH). After 1 second, the dark potential $VDD_P$(V) was measured to obtain a dark decay rate DDR (DDR=$V_0-V_{DDP}/V_0\times 100(\%)$). Then, the photoreceptor was exposed to monochromatic light of 780 nm which was isolated from light emitted from a tungsten lamp by means of a monochromator and adjusted to 0.25 μmW/cm$^2$ on the surface of the photoreceptor. The initial sensitivity (dV/dE (V·cm$^2$/erg)) was measured. The results of these measurements are shown in Table 2 below.

EXAMPLES 14 TO 22 AND COMPARATIVE EXAMPLES 3 TO 5

An electrophotographic photoreceptor was prepared in the same manner as in Example 9, except for using the chlorine-containing hydroxygallium phthalocyanine crystals shown in Table 2. The resulting photoreceptor was evaluated in the same manner as in Example 9. The results obtained are shown in Table 2.

TABLE 2

| Example No. | Charge Generating Material Used | $V_0$ (V) | $V_{DDP}$ (V) | DDR (%) | dV/dE (V · cm$^2$/erg) |
|---|---|---|---|---|---|
| Example 13 | Example 1 | −631 | −610 | 3.3 | 298 |
| Example 14 | Example 2 | −603 | −582 | 3.5 | 245 |
| Example 15 | Example 3 | −615 | −589 | 4.2 | 240 |
| Example 16 | Example 4 | −595 | −554 | 6.8 | 196 |
| Example 17 | Example 5 | −609 | −580 | 4.8 | 213 |
| Example 18 | Example 6 | −624 | −588 | 5.6 | 268 |
| Example 19 | Example 7 | −658 | −637 | 3.3 | 157 |
| Example 20 | Example 8 | −633 | −611 | 3.5 | 154 |
| Example 21 | Example 11 | −554 | −522 | 5.8 | 236 |
| Example 22 | Example 12 | −561 | −529 | 5.7 | 251 |
| Comparative Example 3 | x-H$_2$Pc | −580 | −552 | 4.8 | 53 |
| Comparative Example 4 | Comparative Example 1 | −576 | −521 | 9.5 | 185 |
| Comparative Example 5 | Comparative Example 2 | −671 | −638 | 4.9 | 2 |

As described above, the halogen-containing hydroxygallium phthalocyanine crystals according to the present invention each have a novel crystal form and are useful as a charge generating material for preparation of an electrophotographic photoreceptor. An electrophotographic photoreceptor prepared by using the halogen-containing hydroxygallium phthalocyanine exhibits high photosensitivity with stability.

While the invention has been described in detail and with reference to specific examples thereof, it will be apparent to one skilled in the art that various changes and modifications can be made therein without departing from the spirit and scope thereof.

What is claimed is:

1. A halogen-containing hydroxygallium phthalocyanine crystal showing intense diffraction peaks at Bragg angles (2Θ±0.2°) of (1) 7.7°, 16.5°, 25.1° and 26.6°; (2) 7.9°, 16.5°, 24.4°, and 27.6°; (3) 7.0°, 7.5°, 10.5°, 11.7°, 12.7°, 17.3°, 18.1°, 24.5°, 26.20°, and 27.1°; 4) 7.5°, 9.9°, 12.5°, 16.3°, 18.6°, 25.1°, and 28.3°; or (5) 6.8°, 12.8°, 15.8°, and 26.0°.

* * * * *